United States Patent
Liu et al.

(10) Patent No.: US 11,616,451 B2
(45) Date of Patent: Mar. 28, 2023

(54) PRE-CHARGEABLE DCDC CONVERSION CIRCUIT

(71) Applicant: Shenzhen Vmax New Energy Co., Ltd., Guangdong (CN)

(72) Inventors: Jun Liu, Guangdong (CN); Yingying Feng, Guangdong (CN); Shun Yao, Guangdong (CN); Changsheng Zhang, Guangdong (CN)

(73) Assignee: SHENZHEN VMAX NEW ENERGY CO., LTD., Guangdong (CN)

( * ) Notice: Subject to any disclaimer, the term of this patent is extended or adjusted under 35 U.S.C. 154(b) by 94 days.

(21) Appl. No.: 17/203,894

(22) Filed: Mar. 17, 2021

(65) Prior Publication Data
US 2021/0296993 A1  Sep. 23, 2021

(30) Foreign Application Priority Data
Mar. 17, 2020  (CN) .......................... 202010187973.6

(51) Int. Cl.
*H02M 3/337* (2006.01)
*H02M 3/335* (2006.01)
*H02M 1/36* (2007.01)

(52) U.S. Cl.
CPC ..... *H02M 3/3376* (2013.01); *H02M 3/33584* (2013.01); *H02M 1/36* (2013.01)

(58) Field of Classification Search
CPC .. H02M 3/3376; H02M 3/33584; H02M 1/36; H02M 3/337
See application file for complete search history.

(56) References Cited

U.S. PATENT DOCUMENTS

2013/0038305 A1* 2/2013 Arno ...................... H02M 3/07
                                                        323/282
2020/0006970 A1* 1/2020 Chen ...................... H02M 1/36

FOREIGN PATENT DOCUMENTS

CN          110649822 A   *   1/2020

* cited by examiner

*Primary Examiner* — Adolf D Berhane
*Assistant Examiner* — Afework S Demisse
(74) *Attorney, Agent, or Firm* — Locke Lord LLP; Tim Tingkang Xia, Esq.

(57) ABSTRACT

A pre-chargeable DCDC conversion circuit includes a high-voltage side conversion module connected to a primary winding of a main transformer T1, a low-voltage side conversion module connected to a secondary winding of the main transformer, and a controller used for controlling the high-voltage side conversion module and the low-voltage side conversion module. A pre-charging module is connected in series in a direct-current bus of the low-voltage side conversion module, and the pre-charging module is used for pre-charging a capacitor of electric equipment connected to a direct-current bus of the high-voltage side conversion module when the complete machine is powered on. The pre-charging module and a forward DCDC share most of power devices and power loops, and only a small number of devices are added, such that the volume and cost are reduced compared with an independent pre-charging branch, and the control mode is simple.

6 Claims, 8 Drawing Sheets

PRE-CHARGEABLE DCDC CONVERSION CIRCUIT

CROSS-REFERENCE TO RELATED PATENT APPLICATION

This application claims priority to Chinese Patent Application No. 202010187973.6 filed in China on Mar. 17, 2020. The disclosure of the above application is incorporated herein in its entirety by reference.

TECHNICAL FIELD

The present invention belongs to the technical field of charging of electric vehicles, and more particularly relates to a pre-chargeable DCDC conversion circuit.

BACKGROUND ART

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the needs to save energy, reduce emissions, and control air pollution, new energy vehicles are gradually being commercialized in the market, and electric vehicles play a key role in new energy vehicles. Electrical equipment for electric vehicles has a relatively large equivalent capacitance. During the startup process of the complete machine, the instantaneous charging current is very large, which may easily burn a circuit or cause unsafe factors. To solve this problem, in the prior art, a pre-charging branch is connected in parallel next to a main relay between a high-voltage battery and the electrical equipment. A capacitor is slowly charged with a small current, and then the main relay is powered off after the capacitor voltage increases and the charging current decreases. In the prior art, the pre-charging branch is connected in parallel with the main relay S1 (referring to a block diagram of a control principle of the complete machine of the present invention shown in FIG. 1, the pre-charging branch is connected in parallel to both ends of the main relay S1, but in the prior art, the pre-charging branch is connected with a dashed line, indicating that there is no such connection in the present invention). The pre-charging branch is separated from a DCDC converter, which causes the defects of many components, large volume, high cost, and complicated control.

Therefore, how to design a DCDC conversion circuit that integrates a pre-charging function in a DCDC converter, reuses the existing DCDC device as much as possible, and reduces the volume and cost is a technical problem to be urgently solved in the industry.

SUMMARY

In order to solve the above defects in the prior art, the present invention proposes a pre-chargeable DCDC conversion circuit.

The technical solution adopted by the present invention is as follows: a pre-chargeable DCDC conversion circuit comprises a high-voltage side conversion module connected to a primary winding of a main transformer T1, a low-voltage side conversion module connected to a secondary winding of the main transformer, and a controller used for controlling the high-voltage side conversion module and the low-voltage side conversion module, wherein a pre-charging module is connected in series in a direct-current bus of the low-voltage side conversion module, and the pre-charging module is used for pre-charging a capacitor of electric equipment connected to a direct-current bus of the high-voltage side conversion module when the complete machine is powered on.

The pre-charging module comprises a secondary transformer L1; a primary winding of the secondary transformer is connected in series in the direct-current bus of the low-voltage side conversion module; one end of the secondary winding of the secondary transformer is connected to an anode of a ninth diode D9, and the other end of the secondary winding of the secondary transformer is connected to a negative bus of the high-voltage side conversion module and one end of a fifth capacitor C5; and a cathode of the ninth diode is connected to the other end of the fifth capacitor and a positive bus of the high-voltage side conversion module.

During pre-charging, the controller sends a first PWM control signal to a power switch in the low-voltage side conversion module, converts a direct current connected to the low-voltage side conversion module into an alternating current, and transmits electric energy to the high-voltage side conversion module through the secondary transformer L1 and the ninth diode D9.

During pre-charging, the controller controls a power switch of an upper bridge arm in the high-voltage side conversion module to be turned off, and sends a second PWM control signal to a power switch of a lower bridge arm in the high-voltage side conversion module.

The pre-charging comprises a slow-start phase and a closed-loop charging phase; in the slow-start phase, a duty cycle of the first PWM control signal ranges from 0% to 50%; and in the closed-loop charging phase, the duty cycle of the first PWM control signal is 50%.

The high-voltage side conversion module is of a full-bridge structure and comprises a first power switch Q1, a second power switch Q2, a third power switch Q3, and a fourth power switch Q4.

The high-voltage side conversion module is of a half-bridge rectification structure and comprises a first power switch Q1 and a third power switch Q3.

The low-voltage side conversion module is of a push-pull structure and comprises a fifth power switch Q5 and a sixth power switch Q6.

The low-voltage side conversion module is of a full-bridge structure and comprises a fifth power switch Q5, a sixth power switch Q6, a seventh power switch Q7, and an eighth power switch Q8.

The technical solution of the present invention has the following beneficial effects:

the present invention provides a pre-chargeable DCDC conversion circuit in order to overcome the defects of the prior art. The pre-chargeable DCDC conversion circuit is improved based on an original DCDC converter. The pre-charging module and a forward DCDC share most of power devices and power loops, and only a small number of devices are added, such that the volume and cost are reduced compared with an independent pre-charging branch, and the control mode is simple.

BRIEF DESCRIPTION OF THE DRAWINGS

The present invention will be described in detail below in conjunction with embodiments and accompanying drawings, in which.

DETAILED DESCRIPTION

In order to make the objects, technical solutions and advantages of the present disclosure clearer, the following will describe the present invention in detail in conjunction with accompany drawings and embodiments. It should be understood that the specific embodiments described here are only used to explain the present invention, but not used to limit the present invention.

The present invention discloses a pre-chargeable DCDC conversion circuit. The pre-chargeable DCDC conversion circuit comprises a high-voltage side conversion module connected to a primary winding of a main transformer T1, a low-voltage side conversion module connected to a secondary winding of the main transformer, and a controller used for controlling the high-voltage side conversion module and the low-voltage side conversion module, wherein a pre-charging module is connected in series in a direct-current bus of the low-voltage side conversion module, and the pre-charging module is used for pre-charging a capacitor of electric equipment connected to a direct-current bus of the high-voltage side conversion module when the complete machine is powered on. Pre-charging is a reverse operation. After the pre-charging is over: this circuit may be in a reverse operation for a long time; or stops the reverse operation and switches to a forward operation. That is, the high-voltage side conversion module supplies power to the capacitor of the electrical equipment normally and also supplies power to the low-voltage side conversion module.

Figure 1:
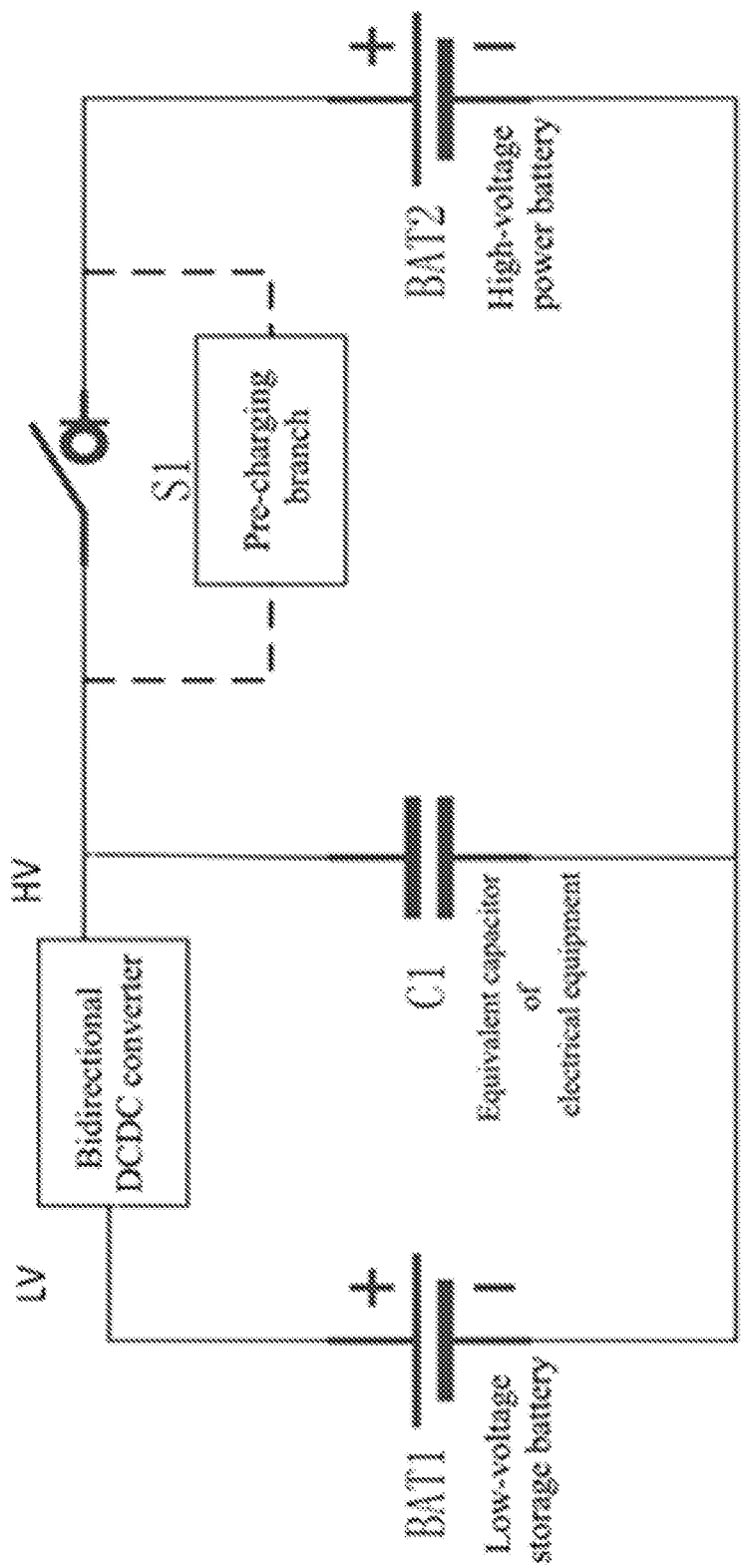
FIG. 1 is a block diagram of a control principle of the complete machine of the present invention.

Referring to the block diagram of the control principle of the complete machine of the present invention shown in FIG. 1, when the whole machine is started, the main relay is disconnected from a high-voltage battery pack. An equivalent capacitor of the electrical equipment is charged with a low-voltage storage battery through the DCDC conversion circuit (the bidirectional DCDC converter in FIG. 1 is the circuit claimed for this application). First, the equivalent capacitor of the electrical equipment is pre-charged slowly with a small current, and the pre-charging ends after the capacitor voltage increases and the charging current decreases; the main relay is then closed, and the high-voltage battery pack supplies power to the electrical equipment, and supplies power to the low-voltage battery and other loads on the low-voltage side through the DCDC converter.

Figure 2:
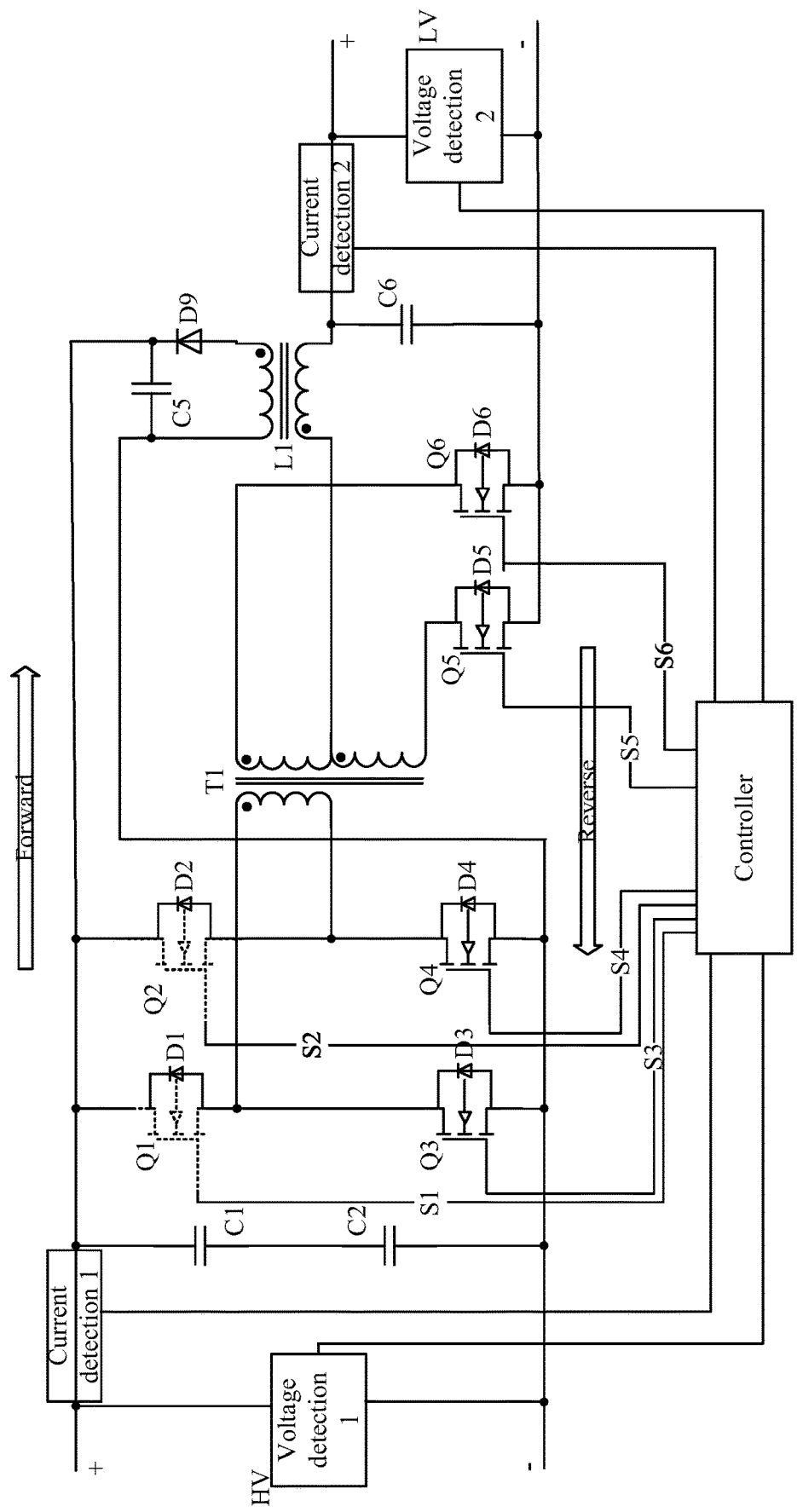
FIG. 2 is a circuit diagram of a full-bridge+push-pull mode according to Embodiment 1 of the present invention.

Referring to Embodiment 1 shown in FIG. 2, the pre-charging module comprises a secondary transformer L1; a primary winding of the secondary transformer is connected in series in the direct-current bus of the low-voltage side conversion module; one end of the secondary winding of the secondary transformer is connected to an anode of a ninth diode D9, and the other end of the secondary winding of the secondary transformer is connected to a negative bus of the high-voltage side conversion module and one end of a fifth capacitor C5; and a cathode of the ninth diode is connected to the other end of the fifth capacitor and a positive bus of the high-voltage side conversion module.

During pre-charging, the controller sends a first PWM control signal to power switches (Q5, Q6 in FIG. 2) in the low-voltage side conversion module, converts a direct current connected to the low-voltage side conversion module into an alternating current, and transmits electric energy to the high-voltage side conversion module through the secondary transformer L1 and the ninth diode D9.

During pre-charging, the controller controls power switches (Q1, Q2 in FIG. 2) of an upper bridge arm in the high-voltage side conversion module to be turned off, and sends a second PWM control signal to power switches (Q3, Q4 in FIG. 2) of a lower bridge arm in the high-voltage side conversion module.

The operating principle of the present invention will be described in detail below with reference to FIG. 2:

in FIG. 2, Q1, Q2, Q3, Q4, Q5, and Q6 are power field-effect transistors; and diodes D1, D2, D3, D4, D5, and D6 are body diodes of Q1, Q2, Q3, Q4, Q5, and Q6, respectively.

During forward operation, a full-bridge operating mode is involved. A high-voltage side direct-current voltage V1 is chopped and converted by MOS transistors Q1 to Q4 to an alternating-current voltage, then transmitted to a secondary stage through the transformer T1, rectified by Q5 and Q6, filtered by L1 and a capacitor 5, and then converted into a direct-current voltage V2.

The first PWM control signals S5 and S6 control Q5 and Q6, wherein S5 and S6 have the same duty ratios, and a phase difference of 180°. The second PWM control signals S3 and S4 control Q3 and Q4, wherein Q3 and Q4 are turned on and off synchronously, with a frequency being twice that of S5 and S6. During reverse operation, a push-pull+boosting mode is involved. In the push-pull mode, S5 and S6 have the same output duty ratios, and a phase difference of 180°. When the duty ratios of S5 and S6 are less than 50%, a slow-start strategy is set. The direct-current voltage V2 is chopped and converted into an alternating-current voltage by the MOS transistors Q5 and Q6, then converted to the V1 side through the transformer T1, rectified and filtered by transistors D1 to D4 and capacitors C1 and C2, and then converted into V1. S3 and S4 are turned on at the same time to store additional energy to L1, and the energy stored in L1 is released to the V1 side through a flyback winding loop. In the boosting mode, the duty cycles of S5 and S6 are greater than 50% and remain fixed, S1 and S2 are in low levels, and the duty cycles of S3 and S4 are adjusted to control an output voltage, and Q3 and Q4 are turned on at the same time. That is, a coil on the V1 side of T1 is short-circuited, such that an inductor L1 stores energy at this time. When Q3 and Q4 are turned off, the energy stored in L1 is released to the V1 side through the transformer T1 or the flyback winding loop (depending on the output voltage of the V1 side).

In a preferred embodiment, the pre-charging comprises a slow-start phase and a closed-loop charging phase; in the slow-start phase, a duty cycle of the first PWM control signal ranges from 0% to 50%; and in the closed-loop charging phase, the duty cycle of the first PWM control signal is 50%. The second PWM control is a closed-loop control, which can be controlled according to the output voltage, and the second PWM control signal ranges from 0% to 50%.

Figure 3:
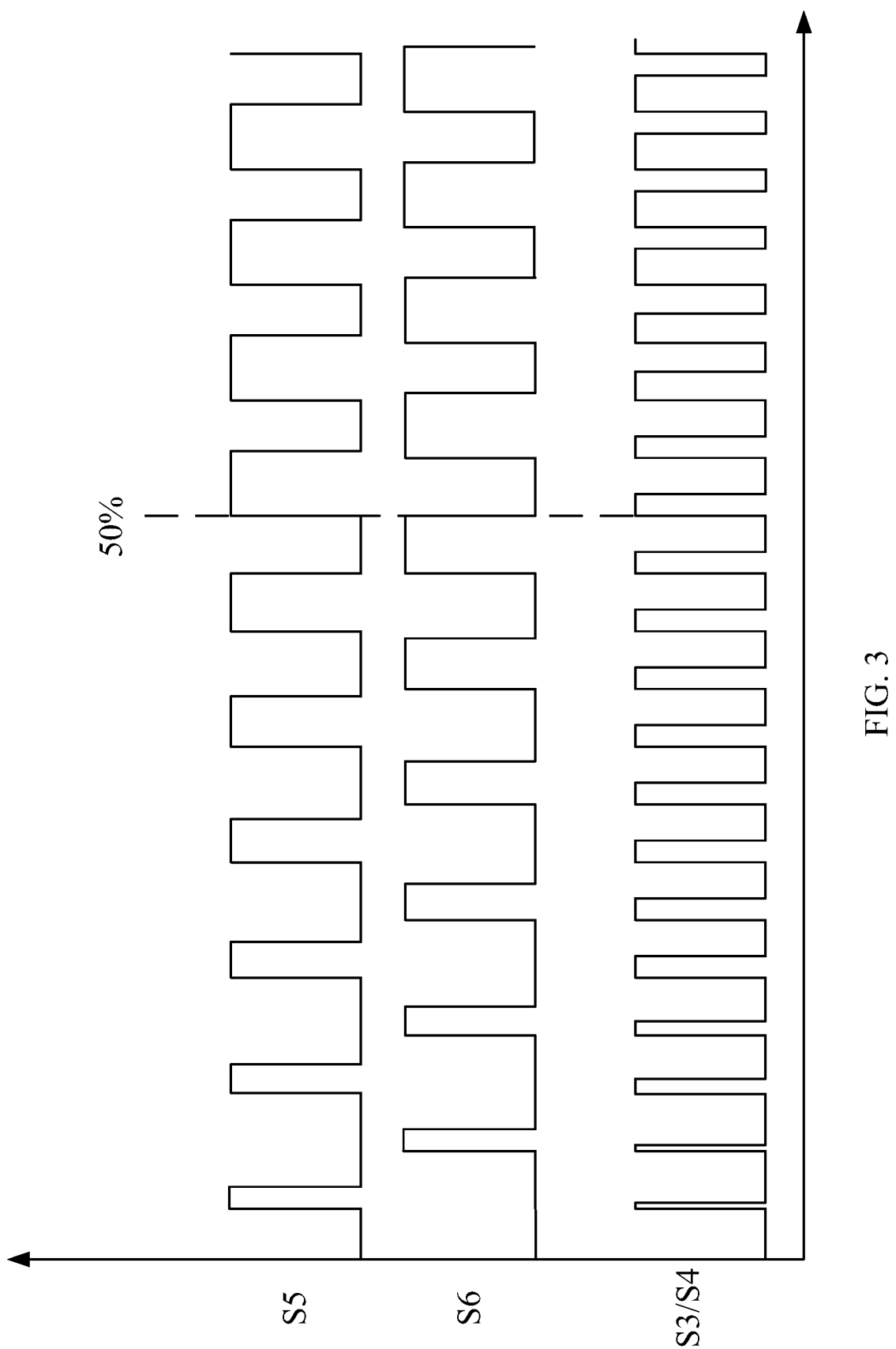
FIG. 3 is a pre-charging control timing diagram of the present invention.

Referring to the pre-charging control timing diagram shown in FIG. 3, the left side belongs to the slow-up phase, and the right side belongs to the closed-loop charging phase. The duty cycles of signals S5 and S6 that control Q5 and Q6 on the left are less than 50%, and are fixed at 50% on the right side.

In some embodiments, the high-voltage side conversion module is of a full-bridge structure and comprises a first power switch Q1, a second power switch Q2, a third power switch Q3, and a fourth power switch Q4.

In some other embodiments, the high-voltage side conversion module is of a half-bridge rectification structure and comprises a first power switch Q1 and a third power switch Q3.

In some other embodiments, the low-voltage side conversion module is of a push-pull structure and comprises a fifth power switch Q5 and a sixth power switch Q6.

In some other embodiments, the low-voltage side conversion module is of a full-bridge structure and comprises a fifth power switch Q5, a sixth power switch Q6, a seventh power switch Q7, and an eighth power switch Q8.

FIG. 2 is a circuit diagram of a full-bridge+push-pull rectification mode according to Embodiment 1 of the present invention, in which, the high-voltage side conversion module is of a full-bridge structure and comprises a first power switch Q1, a second power switch Q2, a third power switch Q3, and a fourth power switch Q4. Q1 and Q2 are two upper bridge arms, and Q3 and Q4 are two lower bridge arms. The low-voltage side conversion module is of a push-pull structure and comprises a fifth power switch Q5 and a sixth power switch Q6. Both Q5 and Q6 are connected to a negative direct-current bus on the voltage side.

Figure 4:
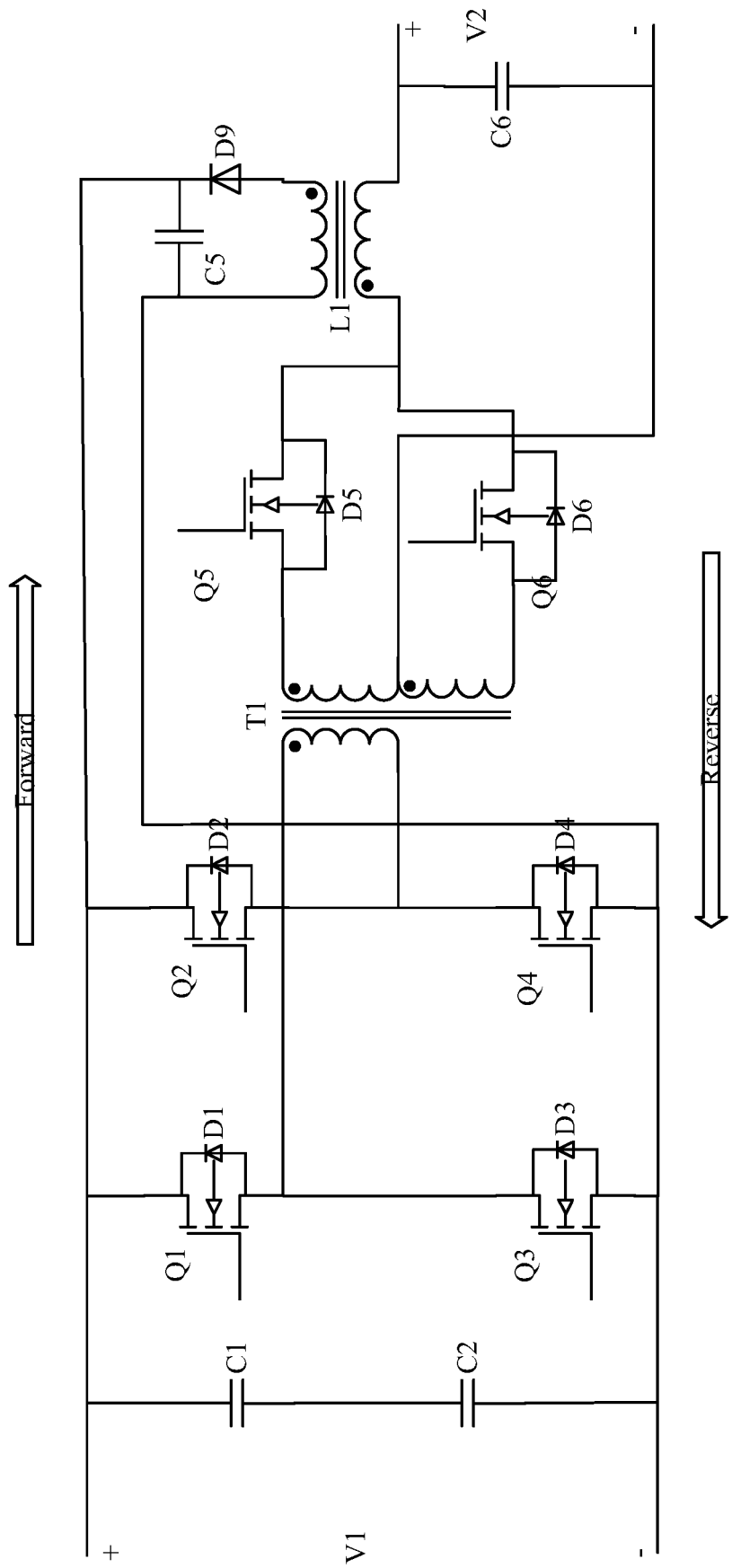
FIG. 4 is a circuit diagram of a full-bridge+full-wave rectification mode according to Embodiment 2 of the present invention.

FIG. 4 is a circuit diagram of a full-bridge+full-wave rectification mode according to Embodiment 2 of the present invention, in which, the high-voltage side conversion module is of a full-bridge structure and comprises a first power switch Q1, a second power switch Q2, a third power switch Q3, and a fourth power switch Q4. Q1 and Q2 are two upper bridge arms, and Q3 and Q4 are two lower bridge arms. The low-voltage side conversion module is of a push-pull structure and comprises a fifth power switch Q5 and a sixth power switch Q6. Both Q5 and Q6 are connected to a positive direct-current bus on the voltage side.

Figure 5:
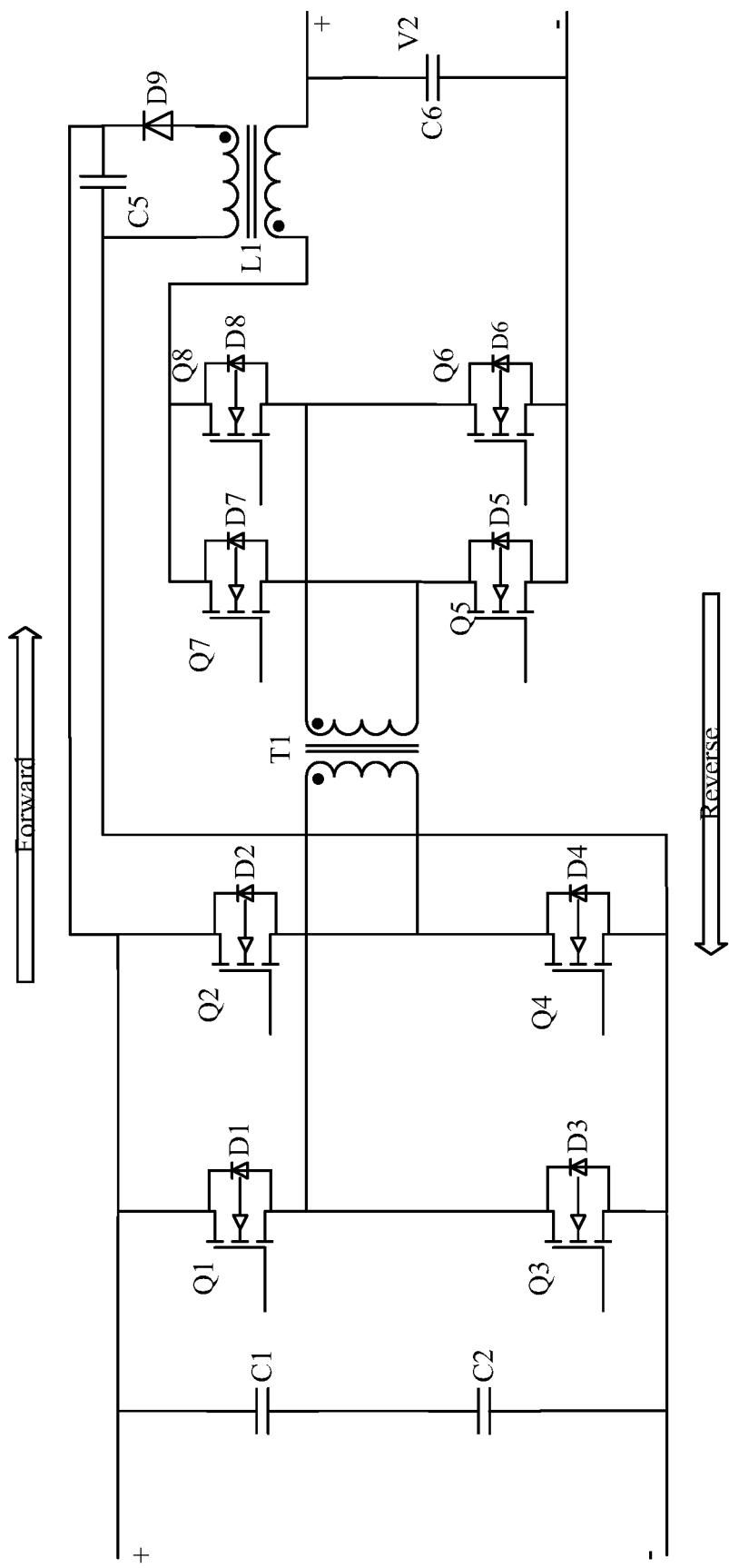
FIG. 5 is a circuit diagram of a full-bridge+full-bridge rectification mode according to Embodiment 3 of the present invention.

FIG. 5 is a circuit diagram of a full-bridge+full-bridge rectification mode according to Embodiment 3 of the present invention, in which, the high-voltage side conversion module is of a full-bridge structure and comprises a first power switch Q1, a second power switch Q2, a third power switch Q3, and a fourth power switch Q4. Q1 and Q2 are two upper bridge arms, and Q3 and Q4 are two lower bridge arms. The low-voltage side conversion module is of a full-bridge structure and comprises a fifth power switch Q5, a sixth power switch Q6, a seventh power switch Q7, and an eighth power switch Q8. Q6 and Q7 are turned on or off synchronously, and Q5 and Q8 are turned on or off synchronously.

Figure 6:
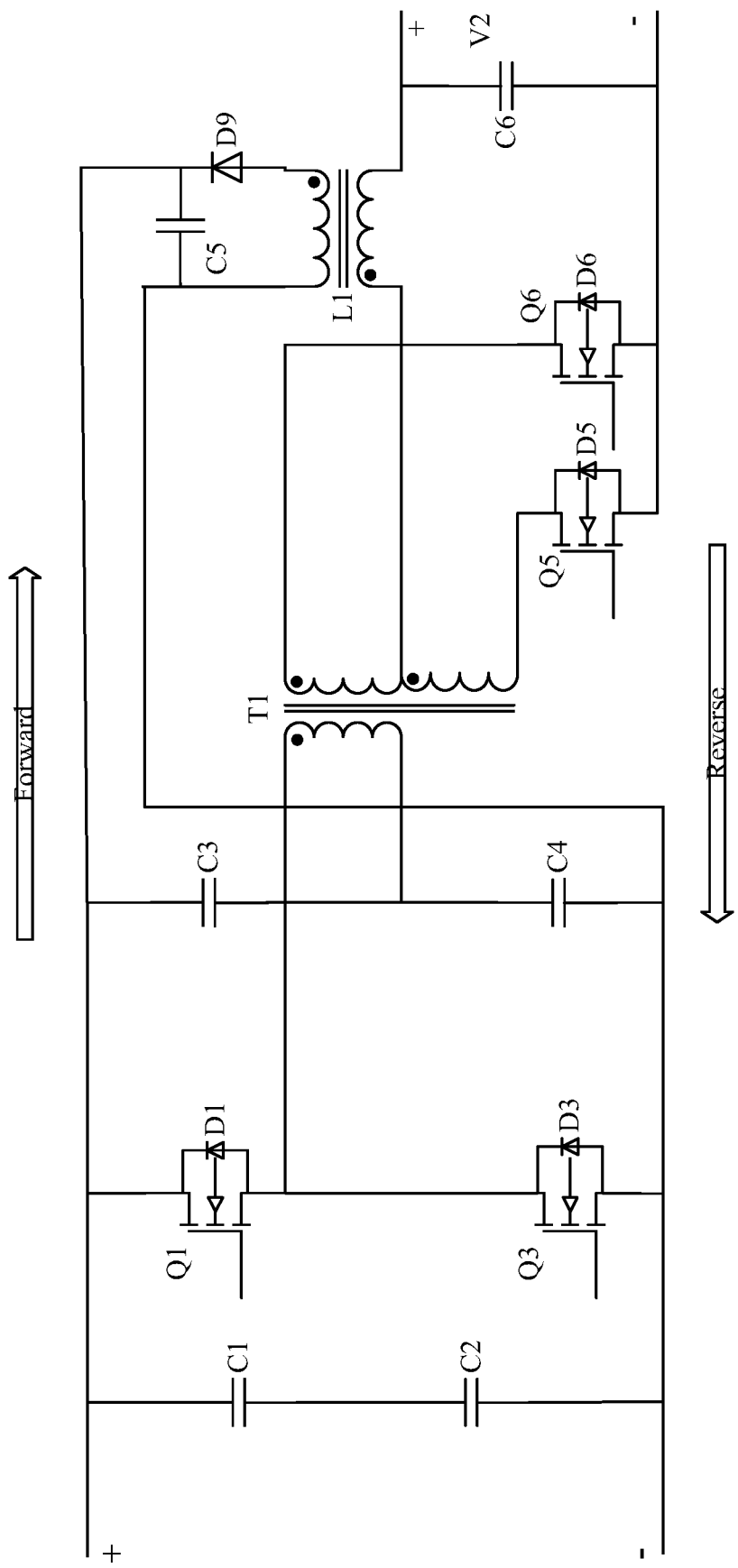
FIG. 6 is a circuit diagram of a half-bridge+push-pull mode according to Embodiment 4 of the present invention.

FIG. 6 is a circuit diagram of a full-bridge+full-wave rectification mode according to Embodiment 4 of the present invention, in which, the high-voltage side conversion module is of a half-bridge rectification structure and comprises a first power switch Q1, and a third power switch Q3. During pre-charging, Q1 remains turned off, and Q3 receives the control of the second PWM control signal. The low-voltage side conversion module is of a push-pull structure and comprises a fifth power switch Q5 and a sixth power switch Q6. Both Q5 and Q6 are connected to a negative direct-current bus on the voltage side.

Figure 7:
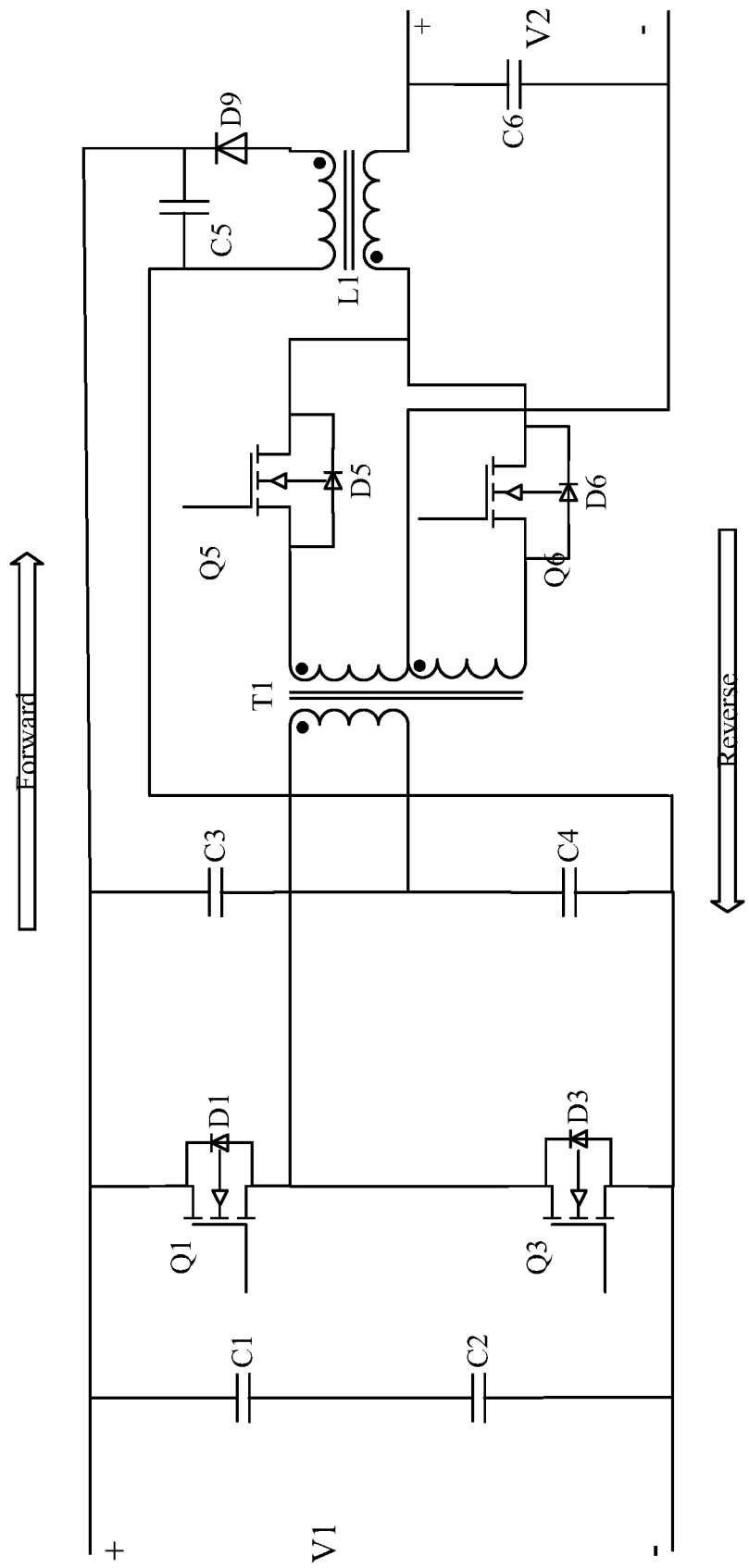
FIG. 7 is a circuit diagram of a half-bridge+full-wave rectification mode according to Embodiment 5 of the present invention.

FIG. 7 is a circuit diagram of a half-bridge+full-wave rectification mode according to Embodiment 5 of the present invention, in which, the high-voltage side conversion module is of a half-bridge rectification structure and comprises a first power switch Q1, and a third power switch Q3. During pre-charging, Q1 remains turned off, and Q3 receives the control of the second PWM control signal. The low-voltage side conversion module is of a push-pull structure and comprises a fifth power switch Q5 and a sixth power switch Q6. Both Q5 and Q6 are connected to a positive direct-current bus on the voltage side.

Figure 8:
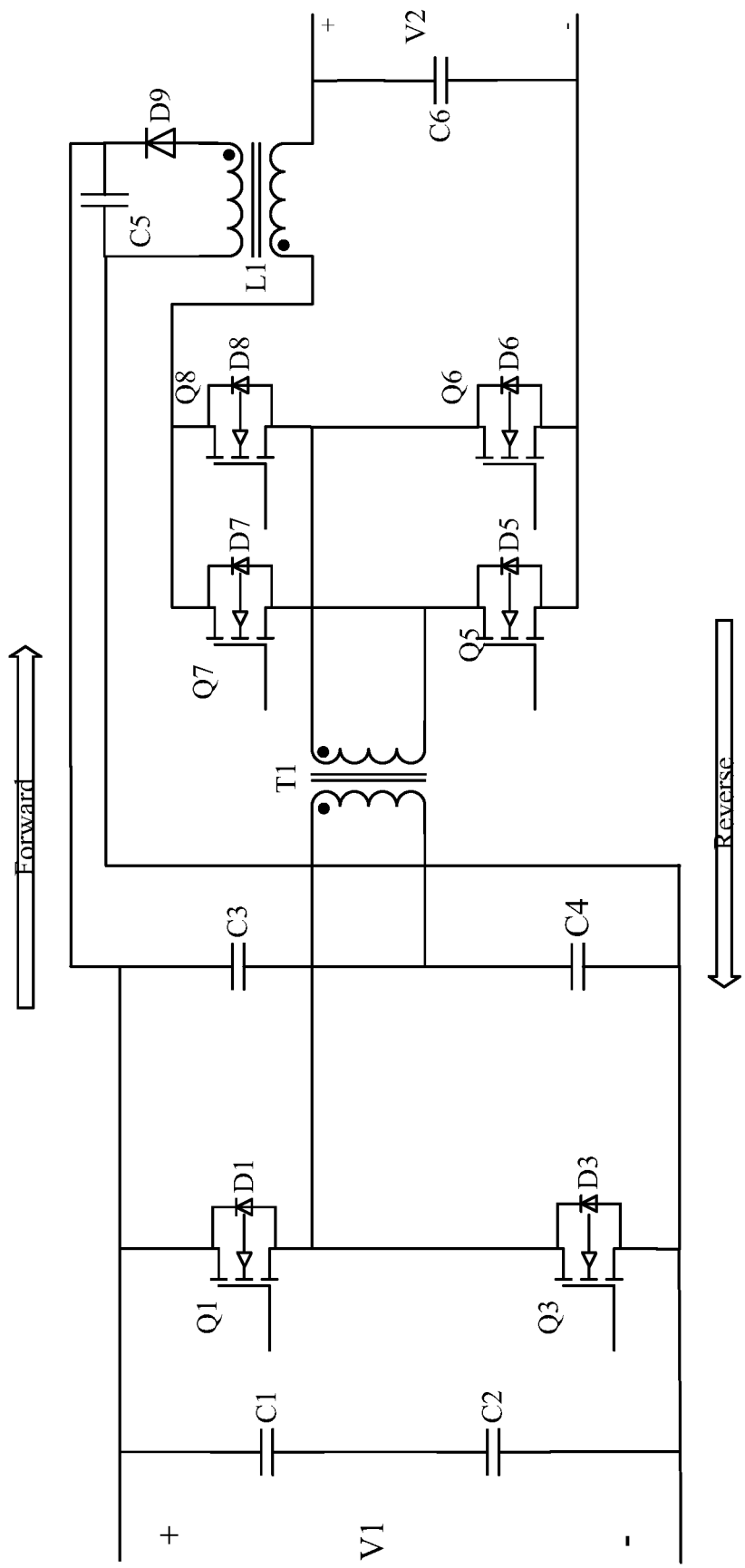
FIG. 8 is a circuit diagram of a half-bridge+full-wave rectification mode according to Embodiment 6 of the present invention.

FIG. 8 is a circuit diagram of a half-bridge+full-wave rectification mode according to Embodiment 6 of the present invention, in which, the high-voltage side conversion module is of a half-bridge rectification structure and comprises a first power switch Q1, and a third power switch Q3. During pre-charging, Q1 remains turned off, and Q3 receives the control of the second PWM control signal. The low-voltage side conversion module is of a full-bridge structure and comprises a fifth power switch Q5, a sixth power switch Q6, a seventh power switch Q7, and an eighth power switch Q8. Q6 and Q7 are turned on or off synchronously, and Q5 and Q8 are turned on or off synchronously.

The above embodiments are only for an exemplary purpose, rather than a limiting role. Any equivalent modifications or changes, without departing from the spirit and scope of this application, shall be included in the scope of the claims of this application.

What is claimed is:

1. A pre-chargeable DCDC conversion circuit, comprising:
   a high-voltage side conversion module connected to a primary winding of a main transformer T1,
   a low-voltage side conversion module connected to a secondary winding of the main transformer, and
   a controller used for controlling the high-voltage side conversion module and the low-voltage side conversion module, wherein a pre-charging module is connected in series in a direct-current bus of the low-voltage side conversion module, and the pre-charging module is used for pre-charging a capacitor of electric equipment connected to a direct-current bus of the high-voltage side conversion module when the electric equipment is powered on,
   wherein the pre-charging module comprises a secondary transformer L1; a primary winding of the secondary transformer is connected in series in the direct-current bus of the low-voltage side conversion module; one end of the secondary winding of the secondary transformer is connected to an anode of a ninth diode D9, and the other end of the secondary winding of the secondary transformer is connected to a negative bus of the high-voltage side conversion module and one end of a fifth capacitor C5; and a cathode of the ninth diode is connected to the other end of the fifth capacitor and a positive bus of the high-voltage side conversion module;
   wherein during pre-charging, the controller sends a first PWM control signal to a power switch in the low-voltage side conversion module, converts a direct current connected to the low-voltage side conversion module into an alternating current, and transmits electric energy to the high-voltage side conversion module through the secondary transformer L1 and the ninth diode D9; and wherein during pre-charging, the controller controls a power switch of an upper bridge arm in the high-voltage side conversion module to be turned off, and sends a second PWM control signal to a power switch of a lower bridge arm in the high-voltage side conversion module.

2. The pre-chargeable DCDC conversion circuit according to claim 1, wherein the pre-charging comprises a slow-start phase and a closed-loop charging phase; in the slow-start phase, a duty cycle of the first PWM control signal ranges from 0% to 50%; and in the closed-loop charging phase, the duty cycle of the first PWM control signal is 50%.

3. The pre-chargeable DCDC conversion circuit according to claim 1, wherein the high-voltage side conversion module is of a full-bridge structure and comprises a first power switch Q1, a second power switch Q2, a third power switch Q3, and a fourth power switch Q4.

4. The pre-chargeable DCDC conversion circuit according to claim 1, wherein the high-voltage side conversion module is of a half-bridge rectification structure and comprises a first power switch Q1 and a third power switch Q3.

5. The pre-chargeable DCDC conversion circuit according to claim 1, wherein the low-voltage side conversion module is of a push-pull structure and comprises a fifth power switch Q5 and a sixth power switch Q6.

6. The pre-chargeable DCDC conversion circuit according to claim 1, wherein the low-voltage side conversion module is of a full-bridge structure and comprises a fifth power switch Q5, a sixth power switch Q6, a seventh power switch Q7, and an eighth power switch Q8.

* * * * *